A. R. WEISS.
Machines for Milling Pipe-Tips.

No. 138,825.  Patented May 13, 1873.

Witnesses:
Ernst Bilhuber.
Chas. Wahlers.

Inventor.
Albert R. Weiss

UNITED STATES PATENT OFFICE.

ALBERT RICHARD WEISS, OF BROOKLYN, E. D., NEW YORK.

IMPROVEMENT IN MACHINES FOR MILLING PIPE-TIPS.

Specification forming part of Letters Patent No. 138,825, dated May 13, 1873; application filed August 1, 1872.

*To all whom it may concern:*

Be it known that I, ALBERT RICHARD WEISS, of Brooklyn, E. D., in the county of Kings and State of New York, have invented a new and Improved Machine for Milling Pipe-Tips; and I do hereby declare the following to be a full, clear, and exact description thereof, which will enable those skilled in the art to make and use the same, reference being had to the accompanying drawing forming part of this specification, in which drawing—

Figure 1:
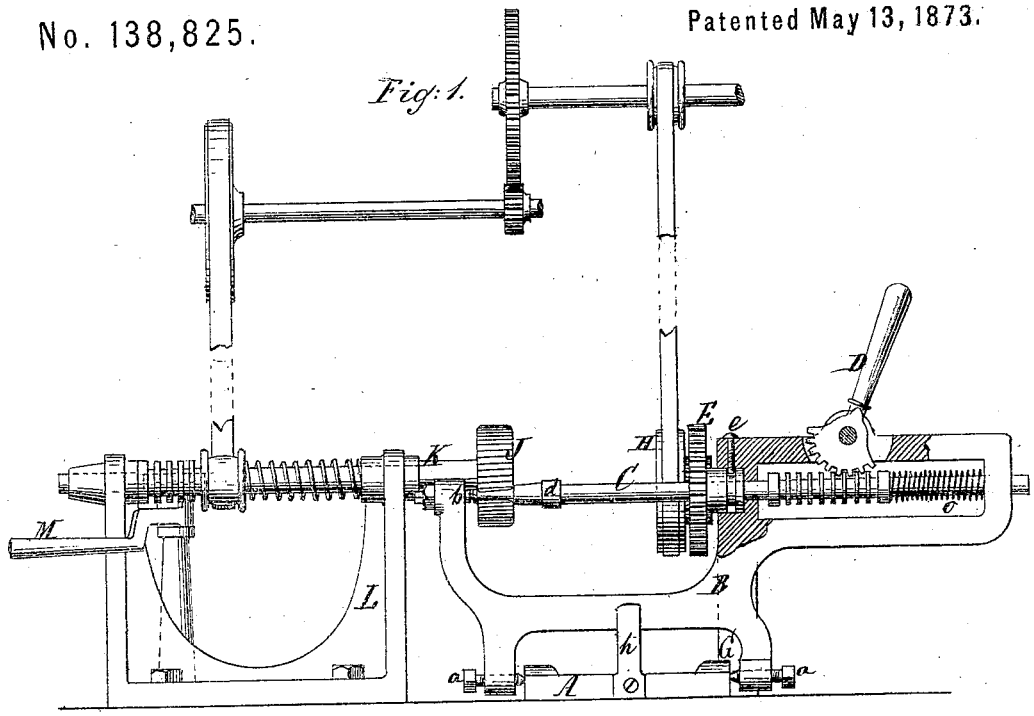
Figure 2:
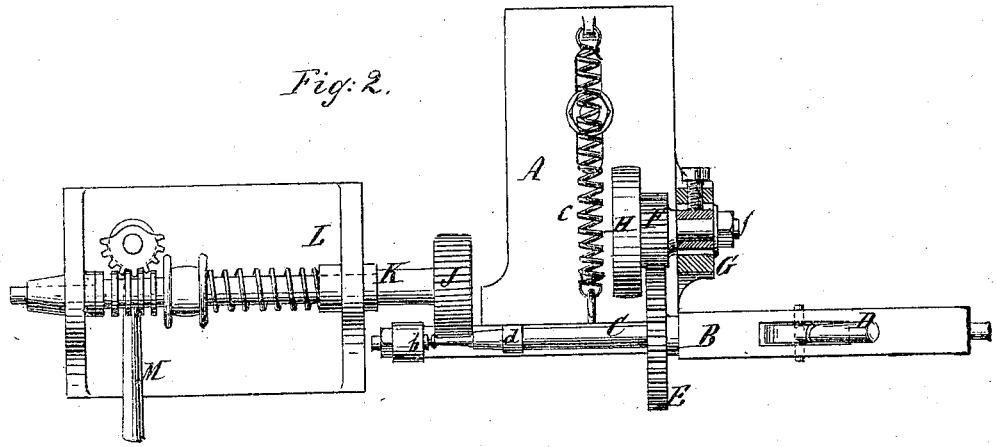
Figure 3:
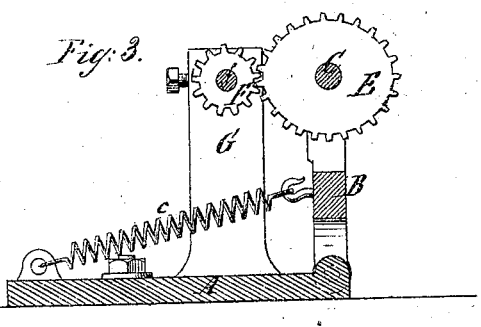

Figure 1 represents a sectional front view of my machine. Fig. 2 is a plan or top view of the same. Fig. 3 is a transverse section of the same in the plane $x$ $x$, Fig. 2.

Similar letters indicate corresponding parts.

This invention consists in a head which swings on pivots, and in which is mounted a center-point and a spindle, which has a sliding motion toward and from the center-point, and which carries a chuck to receive the butt end of the pipe-tip to be milled, the outer end of said tip being supported by the center-point. On the spindle is mounted an elliptical or eccentric cog-wheel, which gears in a circular pinion mounted on a stud, which is secured in a standard rising from the bed-plate of the swinging head. With this swinging head is combined a stationary head carrying a spindle, on which is mounted the milling-tool, and to which a longitudinal sliding motion can be imparted, in addition to its rotary motion, in such a manner that by the action of the elliptical cog-wheel a rotary motion is imparted to the spindle carrying the pipe-tip, and also an oscillating motion toward and from the milling-tool, and thereby the desired shape is imparted to the pipe-tip, while the milling-tool, when moved in a longitudinal direction, is brought to act on pipe-tips exceeding in length the width of said milling-tool.

The swinging head can be adjusted toward and from the milling-tool for tips of greater or less diameter.

In the drawing, the letter A designates a bed-plate, which is provided in its edges with cavities to receive the pointed ends of screws $a$, which form the fulcrums for the swinging head B. This head is provided in one end with a center-point, $b$, and its other end forms the bearing for a spindle, C, which is pressed toward the center-point $b$ by a spring, $o$, and which carries a chuck, $d$, intended to receive the butt end of a pipe-tip. A hand-lever, D, serves to adjust and to lock the spindle C in the required position. On the spindle C is mounted, by means of a feather-key, an elliptical or eccentric cog-wheel, E, the hub of which projects into a cavity in the head B, (see Fig. 1,) and engages with a screw, $e$, so that the same is prevented from moving with the spindle in the direction of its axis, while it is free to revolve and to impart to the spindle the requisite rotary motion. The eccentric cog-wheel E gears in a circular pinion, F, which is mounted on a stud, $f$, secured in a standard, G, which rises from the bed-plate A, and with said pinion is connected a pulley, H, which connects, by a belt, with a line-shaft, as indicated in Fig. 1. A spring, $c$, which extends from the bed-plate A to the swinging head B, (see Figs. 2 and 3,) keeps the eccentric cog-wheel E in gear with the pinion F; and if the pinion is revolved a rotary motion is imparted to the spindle C, and at the same time the head B is compelled to oscillate in accordance with the eccentric shape of the cog-wheel E. J is the milling-tool, which is mounted on the end of a spindle, K, in the proper position in relation to the swinging head B. The spindle K has its bearings in a stationary head, L, and it receives its motion by means of a belt and pulleys from the line-shaft, (see Fig. 1,) the motion of said spindle being geared up, so that it revolves with a much greater velocity than the spindle C in the swinging head B. A hand-lever, M, serves to impart to the spindle K a sliding motion in the direction of its length.

When a pipe-tip is secured in the spindle C and center-point $b$ of the swinging head B and motion is imparted to the spindles C and K the milling-tool acts on the pipe-tip and imparts to the same the required shape, the pipe-tip being caused to swing toward and from the milling-tool by the action of the eccentric wheel E.

The stud $f$ is adjustable toward and from the spindle C, so that the position of said spindle can be adjusted for pipe-tips of different diameter. If the stud is moved toward the spindle the head B is forced back further from the center of the milling-tool and the diameter of the pipe-tip increases, and vice versa.

If the length of the pipe-tip to be milled exceeds the width of the milling-tool the spindle K is made to slide in its bearings, so that the milling-tool will act on the tip throughout its whole length.

A stop, $h$, prevents the head from being thrown out any further than desirable.

It is obvious that other articles besides pipe-tips can be milled on my machine; but I have designed and used it with great advantage for pipe-tips.

What I claim as new, and desire to secure by Letters Patent, is—

The eccentric cog-wheel E mounted on a spindle, C, which slides in a swinging head, B, in combination with a pinion mounted on a fixed stud, and with a spindle, K, carrying a milling-tool, the whole constructed and operating substantially in the manner herein shown and described.

This specification signed by me this 20th day of July, 1872.

ALBERT RICHARD WEISS.

Witnesses:
    W. HAUFF,
    E. F. KASTENHUBER.